(12) United States Patent
Teglia

(10) Patent No.: US 7,426,276 B2
(45) Date of Patent: Sep. 16, 2008

(54) METHOD FOR THE SECURED TRANSFER OF DATA

(75) Inventor: Yannick Teglia, La Bouilladise (FR)

(73) Assignee: STMicroelectronics S.A., Gentilly (FR)

( * ) Notice: Subject to any disclaimer, the term of this patent is extended or adjusted under 35 U.S.C. 154(b) by 402 days.

(21) Appl. No.: 09/738,893

(22) Filed: Dec. 15, 2000

(65) Prior Publication Data

US 2001/0054163 A1 Dec. 20, 2001

(30) Foreign Application Priority Data

Dec. 15, 1999 (FR) .................................. 99 15795

(51) Int. Cl.
*H04L 9/00* (2006.01)
(52) U.S. Cl. ..................................... 380/268
(58) Field of Classification Search .............. 380/210, 380/252, 37, 287
See application file for complete search history.

(56) References Cited

U.S. PATENT DOCUMENTS

| | | | | |
|---|---|---|---|---|
| 5,095,525 | A | 3/1992 | Almgren et al. | 395/400 |
| 5,422,727 | A * | 6/1995 | Iida | 358/296 |
| 5,675,645 | A | 10/1997 | Schwartz et al. | 380/4 |
| 6,195,752 | B1 * | 2/2001 | Pfab | 713/168 |
| 6,408,075 | B1 * | 6/2002 | Ohki et al. | 380/28 |
| 7,116,783 | B2 * | 10/2006 | Teglia | 380/255 |

FOREIGN PATENT DOCUMENTS

GB 2319705 5/1998

OTHER PUBLICATIONS

"The Art of Computer Programming", MMIX, Donald E. Knuth, Addison-Wesley, 1999.*
Book of Applied Cryptography, Alfred J. Menezes, Paul C. van Oorschot, and Scott A. Vanstone, CRC Press (1997).*
French Preliminary Search Report dated Sep. 20, 2000 for French Application No. 9915795.

* cited by examiner

*Primary Examiner*—Emmanuel L Moise
*Assistant Examiner*—Nadia Khoshnoodi
(74) *Attorney, Agent, or Firm*—Lisa K. Jorgenson; Stephen Bongini; Fleit Gibbons Gutman Bongini & Bianco P.L.

(57) ABSTRACT

A method is provided for secured transfer of an N-byte data element from a first memory containing the data element to a second memory through a data bus that is connected between the first memory and the second memory. According to the method, a transfer rule is defined with at least one parameter whose value is chosen at random before each transfer of the data element. The N-byte data element is transferred byte-by-byte through the data bus in accordance with the transfer rule, with each byte transition once and only once through the data bus. In a preferred method, the transfer rule is a permutation of the bytes of the N-byte data element. Also provided is a programmable circuit having a random number generator that supplies at least one parameter of a data transfer rule.

22 Claims, 1 Drawing Sheet

METHOD FOR THE SECURED TRANSFER OF DATA

CROSS-REFERENCE TO RELATED APPLICATIONS

This application is based upon and claims priority from prior French Patent Application No. 99-15795, filed Dec. 15, 1999, the entire disclosure of which is herein incorporated by reference.

BACKGROUND OF THE INVENTION

1. Field of the Invention

The present invention relates to electronic devices, and more specifically to a method for securely transferring data in a programmable circuit.

2. Description of Related Art

In some applications, it is desirable to protect data elements contained in a memory of a programmable circuit from the possibility of being inspected while being transferred to another memory. For example, the secret data elements can be personal data elements that identify the owner of the programmable circuit, program instructions, or keys for data encryption algorithms. The secret data elements are usually stored in read-only memories of the programmable circuit during fabrication. Conventional techniques are used to protect the contents of such read-only memories from a visual inspection. For example, the data elements may be scattered in the memory. However, when the data elements are used, they travel in non-encrypted form on a data bus that can be easily snooped.

In one conventional snooping technique, the current flowing through the bus is measured. This current represents the data that flows through the bus. The snooper makes K measurements of current during K transits of the same data elements, and takes the average of these K measurements to eliminate the noise from the measurement and obtain the exact value of the data element. In general, it is necessary to make about 1000 measurements (K=1000) to remove the noise and obtain the exact value of the data traveling through the bus. This snooping technique is known as "Simple Power Analysis".

Furthermore, in order to reduce the cost of manufacturing products, the secret data elements are often partly the same for a given family of programmable circuits. Thus, if a snooper manages to read the secret data elements stored in one product, they can be used for an entire family of products.

SUMMARY OF THE INVENTION

In view of these drawbacks, it is an object of the present invention to overcome the above-mentioned drawbacks and to improve the security of data in a programmable circuit.

Another object of the present invention is to improve the security of data transition through a data bus.

Yet another object of the present invention is to provide a programmable circuit in which data can be transferred in a highly secure manner.

One embodiment of the present invention provides a method for secured transfer of an N-byte data element from a first memory containing the data element to a second memory through a data bus that is connected between the first memory and the second memory. According to the method, a transfer rule is defined with at least one parameter whose value is chosen at random before each transfer of the data element. The N-byte data element is transferred byte-by-byte through the data bus in accordance with the transfer rule, with each byte transition once and only once through the data bus. In a preferred method, the transfer rule is a permutation of the bytes of the N-byte data element.

Another embodiment of the present invention provides a programmable circuit that includes a data bus, a read-only memory and a writable memory coupled to the data bus, a control unit, and a random number generator coupled to the control unit. The random number generator supplies at least one parameter of a data transfer rule that is used to transfer an N-byte data element from the read-only memory to the writable memory, and the at least one parameter is supplied by the random number generator for each transfer of the data element. The control unit controls the data bus such that bytes of the data element transit byte-by-byte through the data bus, with each byte transition once and only once through the data bus.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
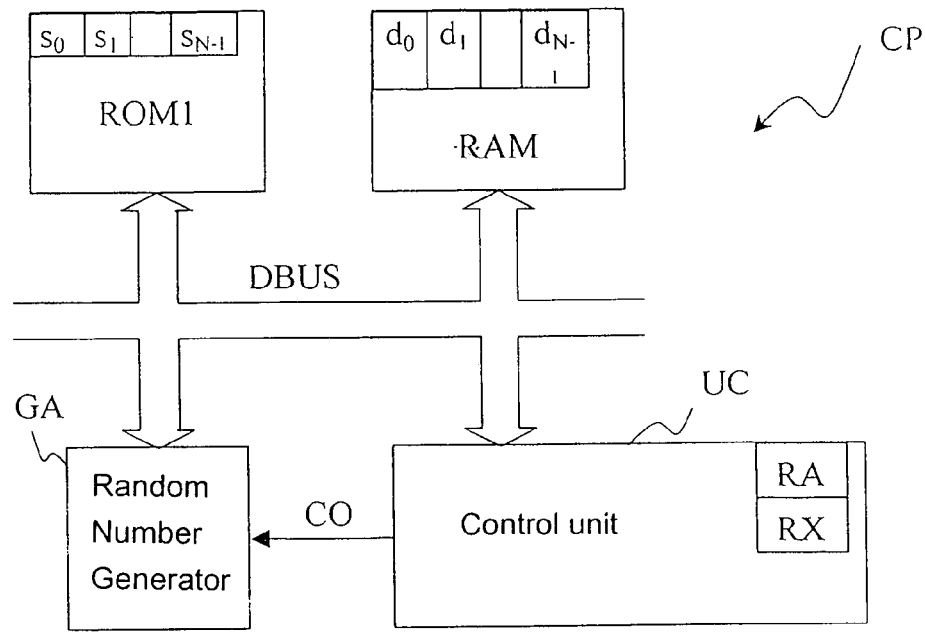
FIG. 1 is a block diagram of a programmable circuit that implements a secure data transfer method according to one embodiment of the present invention.

Preferred embodiments of the present invention will be described in detail hereinbelow with reference to the attached drawings.

Preferred embodiments of the present invention provide methods for securely transferring data in a programmable circuit. In one embodiment, the programmable circuit includes a control unit, a read-only memory containing data to be transferred, a writable memory, and a data bus that is connected between the read-only memory and the writable memory. The data bus is controlled by the control unit. During operation of the programmable circuit, an N-byte secret data element to be transferred transits byte-by-byte through the data bus, with each byte transition only once through the data bus. The bytes of the secret data element are transferred according to a transfer rule having at least one parameter that is randomly chosen by the control unit before each transfer of the secret data element.

Thus, the secret data elements are transferred through the bus in an order that is randomly chosen by the control unit managing the data bus, before each transfer of the secret data element. Thus, each transfer of the same data element is not done in the same order. This makes the commonly used methods of snooping no longer sufficient to obtain the exact value of a secret data element transition through the data bus.

According to one preferred embodiment, the secure data transfer method uses a transfer rule that is a permutation of the elements of the set of N bytes of the secret data element to be transferred. Preferably, the permutation is defined by the following relationship.

$$X=(X0+\text{DIRECTION}*\text{PITCH}*j) \text{ modulo } N,$$

where a first parameter PITCH ranging from 0 to N−1 defines the pitch of the permutation, a second parameter DIRECTION have a value of either 1 or −1 defines the direction of travel of the set of N bytes of the secret data element, a third parameter X0 ranging from 0 to N−1 defines the starting point of the permutation, and a current index X obtained from the first to the third parameters and a loop index j varying from 0 to N−1 indicate the place value of a byte of the secret data element to be transferred.

Throughout this description, the expression "place value of a byte" refers to the rank or number of a byte of the secret data element. In other words, for a secret data element having N bytes with each byte being identified by a place value ranging from 0 to N−1, the byte with the "place value" 0 corresponds to the eight least significant bits and the byte with the "place value" N−1 corresponds to the eight most significant bits of the secret data element.

Preferably, the first and/or second and/or third parameters are chosen randomly by the control unit, before each transfer of the secret data element. Also, it is preferable that the first parameter of the permutation and the number N are mutually prime numbers. For example, the number N is a prime integer and the first parameter of the permutation is an integer ranging from 1 to N−1.

In one illustrative embodiment, the method includes the following steps. First there are initialization and choice of the first to third parameters, with at least one of the first to third parameters being chosen randomly by the control unit. The first to third parameters are stored in a first register of the control unit. Next, the loop index and the current index are initialized. Then, the following sub-steps are repeated N times. A byte of the data element having a place value equal to the current index is read from the read-only memory and stored in a second register of the control unit. Then, the byte stored in the second register is written in the random-access memory. The loop index is incremented and the current index is varied.

In another embodiment, a programmable circuit is provided that includes a control unit, a read-only memory containing data elements to be transferred, a writable memory, and a data bus that is connected between the read-only memory and the writable memory. The data bus is controlled by the control unit. The programmable circuit also has a random number generator for providing at least one parameter of a data transfer rule that is used to transfer an N-byte secret data element from the read-only memory to the random-access memory. The bytes of the secret data element travel byte-by-byte through the data bus, and each byte transits only once through the data bus. The parameter is provided by the random number generator so that the parameter is not the same for each transfer of the secret data element.

FIG. 1 shows an exemplary programmable circuit for implementing a secure data transfer method according to one embodiment of the present invention. As shown, the programmable circuit CP includes a read-only memory ROM that contains an N-byte secret data element stored at addresses $s_0$ to $s_{N-1}$ a random-access memory RAM, a control unit UC, a random number generator GA, and a data bus DBUS that connects the other elements to one another.

The random-access memory RAM is a writable or rewritable memory (for example, of the EPROM or EEPROM type). The random number generator GA is a conventional circuit which, in response to an instruction CO from the control unit UC, gives random whole numbers ranging from 0 to an integer MAX (for example, to 255). The control unit UC receives instructions contained in the read-only memory ROM, and controls the read-only memory RAM and the random number generator GA. The control unit UC includes two registers RA and RX, each of which is a one-byte register.

The programmable circuit CP also has other conventional elements such as data and instruction registers, arithmetic and logic computation circuits, counters, clock circuits, and input and/or output circuits. The programmable circuit can also include several random-access memories, several read-only memories, and/or several random number generators. Furthermore, each element of the programmable circuit CP may communicate with one or more other elements through the control bus, a data bus, and/or an address bus. However, for simplification, only the elements of the programmable circuit CP that relate to the understanding of the present invention are shown in FIG. 1.

An example will now be given to explain the operation of the programmable circuit. In this example, an N-byte secret data element $Oct_0$ to $Oct_{N-1}$ is stored at addresses $s_0$, to $s_{N-1}$ of the read-only memory ROM of the programmable circuit CP and must be transferred from the read-only memory ROM to the random-access memory RAM at addresses $d_0$ to $d_{N-1}$ for use at a later time. For simplicity, N is chosen to be equal to 4.

The secret data element is transferred byte-by-byte, and each byte of the secret data element is transferred only once during the same transfer of data. According to the method of the present invention, the set of N bytes is not transferred in the same order at each transfer of the secret data element. To achieve this, this embodiment of the present invention uses a transfer rule having one or more parameters that are randomly chosen by the control unit before each passage of the secret data element in transit through the data bus. The transfer rule defines the order in which the data elements are transferred from the read-only memory ROM to the random-access memory RAM (i.e., the order in which the bytes of the secret data element transit through the data bus).

Figure 2:
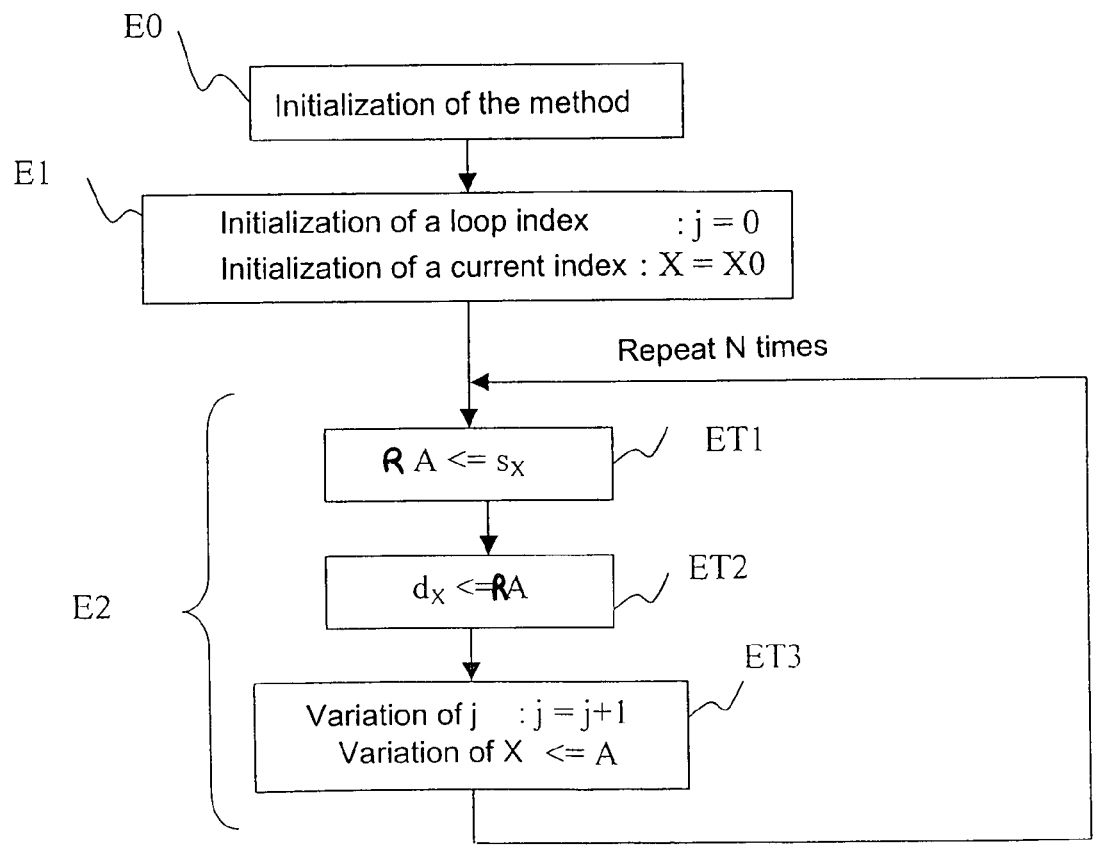
FIG. 2 is a flow chart of a secure data transfer method according to an embodiment of the present invention.

In one illustrative embodiment, a permutation is used as a law of transfer, with one of more parameters of the permutation being chosen randomly. In particular, the following steps are performed, as shown in FIG. 2. First, in step E0, the process is initialized by choosing the parameters of the transfer rule. Next, in step E1, a loop index j is initialized to 0 and a current index X is initialized to X0. In step E2, the following sub-steps are repeated N times. In sub-step ET 1, the byte $Oct_x$ of the data element having the place value X is read from address $s_x$ of the read-only memory ROM and stored in the first register RA of the control unit UC. Then, in sub-step ET 2, the byte contained in the first register RA is written at address $d_x$ of the random-access memory RAM. Next, in sub-step ET 3, the loop index j is incremented j=j+1), and the current index X is varied as a function of the loop index j.

The transfer rule defines the order in which the bytes of the secret data element transit through the data bus DBUS, with this order being defined by the variations of the current index X as a function of the loop index j. In various embodiments, the current index X may vary in different ways, with the essential point being that the current index X takes the set of integer values ranging from 0 to N−1 once and only once during the performance of step E2. For example, permutations characterized by the following transfer rule are used in preferred embodiments.

$$X=(X0+\text{DIRECTION}*\text{PITCH}*j) \text{ modulo } N,$$

where X is the current index indicating the place value of the byte to be transferred, j is the loop index and varies between 0 and N−1, and PITCH, X0, and DIRECTION are three parameters of the law of permutation. The current index X is stored in the second register RX of the control unit UC.

In this illustrative embodiment, the first parameter PITCH ranges from 0 to N−1, and defines the difference, modulo N, between the respective place values of two bytes transferred successively. For example, if the bytes $Oct_0$ and $Oct_3$ of the secret data element (having place values 0 and 3, respectively) transit successively through the bus DBUS, the pitch of the permutation is 3 (PITCH=3−0=3). The second parameter X0 ranges from 0 to N−1, and defines the place value of the first byte transferred. The third parameter DIRECTION takes a value of either 1 or −1, in order to indicate the direction in which the bytes of the data element are traversed.

The choice of the parameters of the permutation is important. In particular, during the performance of step E2, the current index X must take all the integer values ranging from 0 to N−1 when the loop index j varies from 0 to N−1.

In a first embodiment of the present invention, the first parameter PITCH is chosen randomly, and the other two parameters X0 and DIRECTION are constants stored in the read-only memory ROM of the programmable circuit. In this illustrative embodiment, during the method initialization step E0, the random number generator GA supplies a random number to the control unit UC when a control signal CO is received. If the random number is greater than N−1, the control unit UC reduces it modulo N to obtain a first parameter PITCH ranging from 0 to N−1. The control unit UC reads the values of the starting point parameter X0 and the direction of permutation parameter DIRECTION from the read-only memory.

For example, for the transfer of a data element having 4 bytes (N=4), if the generator GA supplies a value of 1 (PITCH=1) and if X0=2 and DIRECTION=1, the transfer rule is written as "X=(2+j) modulo 4" and the bytes of the data elements are transferred in the following order: first $Oct_2$, then $Oct_3$, then $Oct_0$ then $Oct_1$. In another example, if PITCH=3 (with X0=2 and DIRECTION=1), the transfer rule is written as "X=(2+3*j) modulo 4" and the bytes of the data element are transferred in the following order: first $Oct_2$, then $Oct_1$, then $Oct_0$, then $Oct_3$.

The first parameter PITCH and the number N of bytes to be transferred must be chosen as mutually prime numbers to obtain the transfer of all of the bytes of the data element. For this purpose, the number N is preferably a prime number. If not, it is possible to complement the most significant bytes of the data element by "zeros" in order to obtain a prime number N of bytes to be transferred. However, if the number N is not a prime number, it is also possible to use a control unit having means to ascertain that the number PITCH supplied by the generator GA and the number N of bytes are mutually prime numbers, and means to request when necessary a new random number PITCH from the generator GA. In this first embodiment, the number PITCH that is chosen randomly and reduced modulo N (if necessary) can take at most N different values (0 to N−1). Therefore, all of the bytes of the secret data element can be transferred in N different orders.

In a second embodiment, the starting point parameter X0 is chosen randomly and the other two parameters PITCH and DIRECTION are constants stored in the read-only memory ROM of the programmable circuit CP. In this embodiment, during the method initialization step E0, the random number generator GA supplies any number to the control unit UC when a control signal CO is received. If the random number received is higher than N−1, the control unit UC reduces it modulo N to obtain a starting point X0 that ranges from 0 to N−1. The control unit UC reads the values of the other two parameters PITCH and DIRECTION from the read-only memory ROM.

For example, for the transfer of a data element having 4 bytes (N=4), if the generator GA supplies a value of 2 (X0=2) and if PITCH=1 and DIRECTION=−1, the transfer rule is written as "X=(2−j) modulo 4" and the bytes of the data element are transferred in the following order: first $Oct_2$, then $Oct_1$, then $Oct_0$, then $Oct_3$. In another example, if X0=3 (with PITCH=1 and DIRECTION=−1), the bytes of the data element are transferred in the following order: $Oct_3$, then $Oct_2$, then $Oct_1$ then $Oct_0$. In this second embodiment, the starting point X0 that is chosen randomly and reduced modulo N (if necessary) can take at most N different values (ranging from 0 to N−1). Thus, during each transfer of the data element, the bytes of the data element may be transferred in N different orders.

In a third embodiment of the invention, the direction of the permutation DIRECTION is chosen randomly and the other two parameters PITCH and X0 are constants stored in the read-only memory ROM of the programmable circuit CP. In this embodiment, during the method initialization step E0, the random number generator GA supplies a random number to the control unit UC when a control signal CO is received. If the random number received is greater than 1, the control unit UC reduces it modulo 2 to obtain a random number equal to 0 or 1. Then, if the random number is equal to "0", the control unit sets DIRECTION=−1 and conversely, if the random number is equal to 1, the control unit sets DIRECTION=1. During step E0, the control unit UC reads the values of the first parameter PITCH and the starting point of the permutation X0 from the read-only memory ROM.

For example, for the transfer of a data element having 4 bytes (N=4), if the generator GA supplies a direction of permutation of DIRECTION=1 and if PITCH=1 and X0=0, the bytes of the data element are transferred in the following order: first $Oct_0$, then $Oct_1$, then $Oct_2$ then $Oct_3$. In another example, if DIRECTION=−1 (with PITCH=1 and X0=0), the bytes of the data element are transferred in the following order: first $Oct_0$, then $Oct_3$, then $Oct_2$ then $Oct_1$. For this third embodiment, the parameter DIRECTION that is chosen randomly and reduced modulo 2 (if necessary) can take at most 2 different values 0 and 1. Therefore, this third embodiment only allows two different combinations of the set of bytes of the data element to be transferred. This may allow the data element to be found fairly easily.

In further embodiments, the first and/or second and/or third embodiments described above are combined to obtain an even more reliable method of transfer. For example, in a fourth embodiment, all three of the parameters of the law of permutation (PITCH, X0, and DIRECTION) are chosen randomly. In this exemplary embodiment, during the method initialization step E0, the random number generator GA first supplies a first random number to the control unit UC when a first control signal $CO_1$, is received. If the first random number is greater than N−1, the control unit UC reduces it modulo N to obtain a parameter PITCH ranging from 0 to N−1.

The generator GA then supplies a second random number to the control unit when a second control signal $CO_2$ is received. If the second random number is greater than N−1, the control unit UC reduces it modulo N to obtain a starting point X0 ranging from 0 to N−1. Then, when a third control signal $CO_3$ is received, the generator GA supplies a third random number that is reduced modulo 2 by the control unit if it is greater than 1. The control unit chooses DIRECTION=−1 if the third random number is equal to 0, or DIRECTION=1 if the third random number if equal to 1.

The fourth embodiment is particularly valuable. In particular, because all of the parameters of the permutation PITCH, X0, and DIRECTION are chosen randomly, there are p*N*2 possible combinations of the bytes of the same data element, with p being the number of possible values for the first parameter PITCH and PITCH and N being mutually prime numbers. Furthermore, if the number of bytes N is a prime number, there is a maximum number of 2*N*N of possible combinations of the bytes of the same data element. Therefore, it is even more difficult to deduce the correct value of the transferred data element.

In still further embodiments, any other possible combination of the first, second, and third embodiments is possible. For example, it is possible to make a random choice of the first parameter PITCH and the starting point parameter X0, and to fix the value of DIRECTION at 1 or −1.

Accordingly, the present invention makes the simple power analysis method of snooping inoperative. In particular, if K measurements of current are made during K transfers of the same data element on the DBUS and if an average of these K measurements is taken in order to eliminate the noise from the measurement, the result that is obtained will generally be a data element having 8*N identical bits equal to the average value of the 8*N bits of the real data element. The present invention also uses a data transfer method that can be used in parallel with other methods of data protection, without disturbing the operation of these methods. For example, in the description above, it has been assumed that the addresses $s_0$ to $S_{N-1}$ and $d_0$ to $d_{N-1}$ are consecutive. However, it is quite possible to transfer data elements whose bytes are scattered in the ROM. The present invention is particularly suited to any programmable circuit that uses secret data elements.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for secured transfer through a data bus that is connected between a first memory and a second memory, said method comprising the steps of:
   providing an N-byte data element in the first memory, wherein N has a value greater than 1;
   randomly choosing the value of at least one parameter of a transfer rule before a transfer of the N-byte data element, the transfer rule defining the order in which the bytes of the N-byte data element are successively transferred through the data bus from the first memory to the second memory, without changing the order of the bits in that byte; and
   successively transferring the N bytes of the data element byte-by-byte through the data bus to the second memory in the order specified by the transfer rule, with each of the N bytes transition once and only once through the data bus.

2. The method as defined in claim 1, wherein the transfer rule is a permutation of the bytes of the N-byte data element such that in each transfer of the N-byte data element the N bytes do not successively transit through the data bus in the same byte order.

3. The method as defined in claim 2, wherein the permutation is defined by the relationship:

$X(X0+DIRECTION*PITCH*j)$ modulo $N$, where PITCH ranges from 0 to N−1, DIRECTION is either 1 or −1, X0 ranges from 0 to N−1, and j varies from 0 to N−1.

4. The method as defined in claim 3, wherein in the step of randomly choosing, the value of PITCH is chosen randomly before each transfer of the data element.

5. The method as defined in claim 4, wherein in the step of randomly choosing, the value of DIRECTION is chosen randomly before each transfer of the data element.

6. The method as defined in claim 5, wherein in the step of randomly choosing, the value of X0 is chosen randomly before each transfer of the data element.

7. The method as defined in claim 3, wherein in the step of randomly choosing, the value of DIRECTION is chosen randomly before each transfer of the data element.

8. The method as defined in claim 3, wherein in the step of randomly choosing, the value of X0 is chosen randomly before each transfer of the data element.

9. The method as defined in claim 3, wherein in the step of randomly choosing, the value of PITCH and the value of X0 are chosen randomly before each transfer of the data element.

10. The method as defined in claim 3, wherein PITCH and N are mutually prime numbers.

11. The method as defined in claim 3, wherein N is a prime integer and PITCH is an integer ranging from 1 to N−1.

12. The method as defined in claim 3,
   wherein the step of randomly choosing includes the sub-steps of:
      determining the values of PITCH, DIRECTION, and X0, the value of at least one of PITCH, DIRECTION, and X0 being randomly chosen; and
      initializing j and X, and
   the successively transferring step includes the sub-step of repeating N times the steps of:
      reading a byte of the data element from the first memory, the place value of the byte read being equal to the current index (X);
      writing in the second memory the byte that was read from the first memory; and
      incrementing j and varying X.

13. The method as defined in claim 1, wherein the successively transferring step includes the sub-steps of:
   before each successive transfer of one of the bytes of the data element, using the transfer rule to determine a place value of the byte of the N-byte data element to be transferred;
   at each successive transfer of one of the bytes of the data element, transferring the byte of the N-byte data element with the place value that was determined by the transfer rule; and
   repeating the using and transferring sub-steps N times so as to successively transfer the N bytes of the data element through the data bus.

14. The method as defined in claim 1, wherein the successively transferring step includes the sub-steps of:
   first transferring one byte of the N-byte data element whose place value is defined by the transfer rule;

after the first transferring sub-step, transferring another byte of the N-byte data element whose place value is defined by the transfer rule; and repeating the sub-step of transferring another byte until the N bytes of the data element have been successively transferred through the data bus in the order specified by the transfer rule.

15. A machine-readable medium encoded with a program for secured transfer through a data bus that is connected between a first memory and a second memory, said program containing instructions for performing the steps of:

providing an N-byte data element in the first memory, wherein N has a value greater than 1;

randomly choosing the value of at least one parameter of a transfer rule before a transfer of the N-byte data element, the transfer rule defining the order in which the bytes of the N-byte data element are successively transferred through the data bus from the first memory to the second memory, without changing the order of the bits in that byte; and successively transferring the N bytes of the data element byte-by-byte through the data bus to the second memory in the order specified by the transfer rule, with each of the N bytes transition once and only once through the data bus.

16. The machine-readable medium as defined in claim 15, wherein the permutation is defined by the relationship:

$$X=(X0+DIRECTION*PITCH*j) \text{ modulo } N,$$

where PITCH ranges from 0 to N−1, DIRECTION is either 1 or −1, X0 ranges from 0 to N−1, and j varies from 0 to N−1.

17. The machine-readable medium as defined in claim 16, wherein in the step of randomly choosing, the value of PITCH is chosen randomly before each transfer of the data element.

18. The machine-readable medium as defined in claim 16, wherein in the step of randomly choosing, the value of X0 is chosen randomly before each transfer of the data element.

19. The machine-readable medium as defined in claim 16, wherein PITCH and N are mutually prime numbers.

20. The machine-readable medium as defined in claim 16, wherein the step of randomly choosing includes the following sub-steps:

determining the values of PITCH, DIRECTION, and X0, the value of at least one of PITCH, DIRECTION, and X0 being randomly chosen; and initializing j and X, and the successively transferring step includes the sub-step of repeating N times the steps of:

reading a byte of the data element from the first memory, the place value of the byte read being equal to the current index (X);

writing in the second memory the byte that was read from the first memory; and incrementing j and varying X.

21. A programmable circuit comprising:

a data bus;

a read-only memory containing an N-byte data element to be transferred, the read only memory being coupled to the data bus and in the N-byte data element, N having a value greater than 1;

a writable memory coupled to the data bus;

a control unit coupled to the read-only memory and the writeable memory; and a random number generator coupled to the control unit, the random number generator supplying the value of at least one parameter of a data transfer rule before a transfer of the N-byte data element from the read-only memory to the writable memory, the data transfer rule defining the order in which the bytes of the N-byte data element are successively transferred through the data bus from the first memory to the second memory, without changing the order of the bits in that byte;

wherein the control unit controls the data bus such that the N bytes of the data elements are successively transferred byte-by-byte through the data bus to the writeable memory in the order specified by the transfer rule, with each of the N bytes transition once and only once through the data bus.

22. The programmable circuit as defined in claim 21, wherein the permutation is defined by the relationship:

$$X=(X0+DIRECTION*PITCH*j) \text{ modulo } N,$$

where PITCH ranges from 0 to N−1, DIRECTION is either 1 or −1, X0 ranges from 0 to N−1, and j varies from 0 to N−1.

* * * * *

UNITED STATES PATENT AND TRADEMARK OFFICE
CERTIFICATE OF CORRECTION

PATENT NO. : 7,426,276 B2
APPLICATION NO. : 09/738893
DATED : September 16, 2008
INVENTOR(S) : Yannick Teglia It is certified that error appears in the above-identified patent and that said Letters Patent is hereby corrected as shown below:

In the ABSTRACT, line 9, change "transition" to --transiting--.

Claim 1, line 16, change "transition" to --transiting--.

Claim 3, line 3, change "X(X0+DIRECTION*PITCH*j) modulo N," to --X = (X0 + DIRECTION * PITCH * j) modulo N,--.

Claim 15, line 17, change "transition" to --transiting--.

Claim 21, line 23, change "transition" to --transiting--.

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,426,276 B2
APPLICATION NO.  : 09/738893
DATED            : September 16, 2008
INVENTOR(S)      : Yannick Teglia It is certified that error appears in the above-identified patent and that said Letters Patent is hereby corrected as shown below:

In the ABSTRACT, line 9, change "transition" to --transiting--.

Column 7, Claim 1, line 64, change "transition" to --transiting--.

Column 8, Claim 3, line 6, change "X(X0+DIRECTION*PITCH*j) modulo N," to --X = (X0 + DIRECTION * PITCH * j) modulo N,--.

Column 9, Claim 15, line 24, change "transition" to --transiting--.

Column 10, Claim 21, line 35, change "transition" to --transiting--.

This certificate supersedes the Certificate of Correction issued February 24, 2009.

Signed and Sealed this

Seventeenth Day of March, 2009

JOHN DOLL
*Acting Director of the United States Patent and Trademark Office*